B. E. GETCHELL.
METER TESTING SWITCH.
APPLICATION FILED NOV. 17, 1919.
1,364,364.
Patented Jan. 4, 1921.
3 SHEETS—SHEET 1.
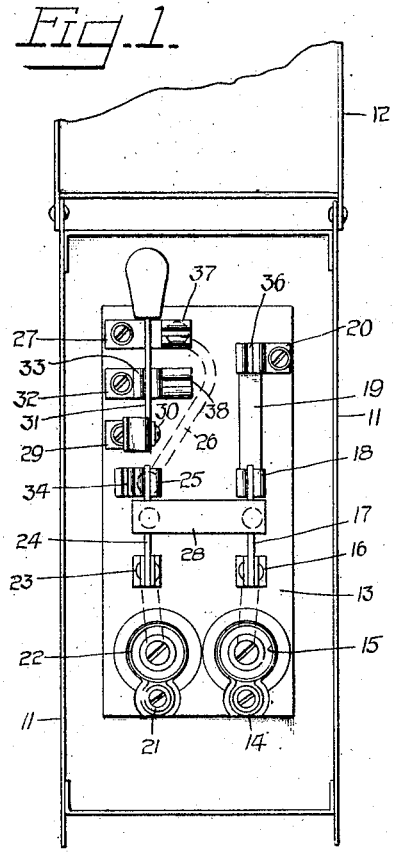
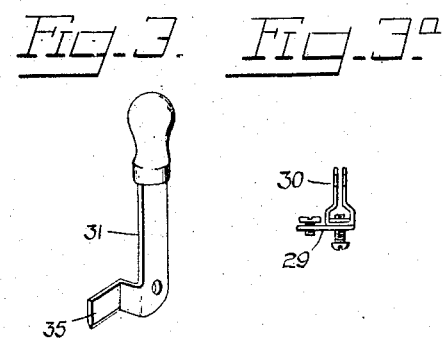
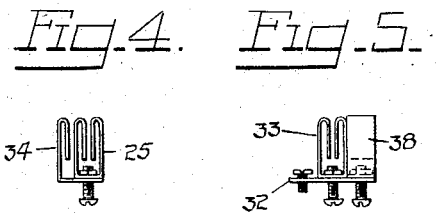
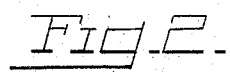
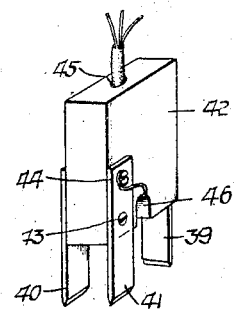
INVENTOR
B. E. Getchell
ATTORNEYS B. E. GETCHELL.
METER TESTING SWITCH.
APPLICATION FILED NOV. 17, 1919.
1,364,364.
Patented Jan. 4, 1921.
3 SHEETS—SHEET 2.
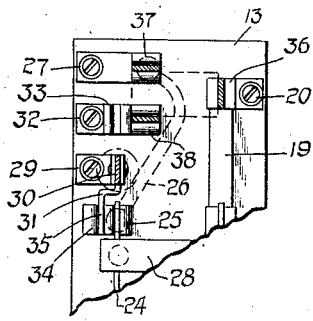
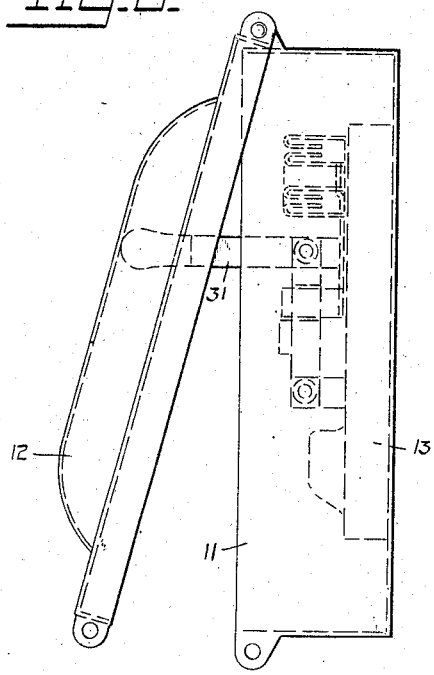
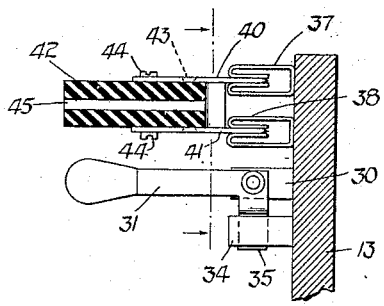
WITNESS:
INVENTOR
B.E. Getchell
BY
ATTORNEYS B. E. GETCHELL.
METER TESTING SWITCH.
APPLICATION FILED NOV. 17, 1919.
1,364,364.
Patented Jan. 4, 1921.
3 SHEETS—SHEET 3.
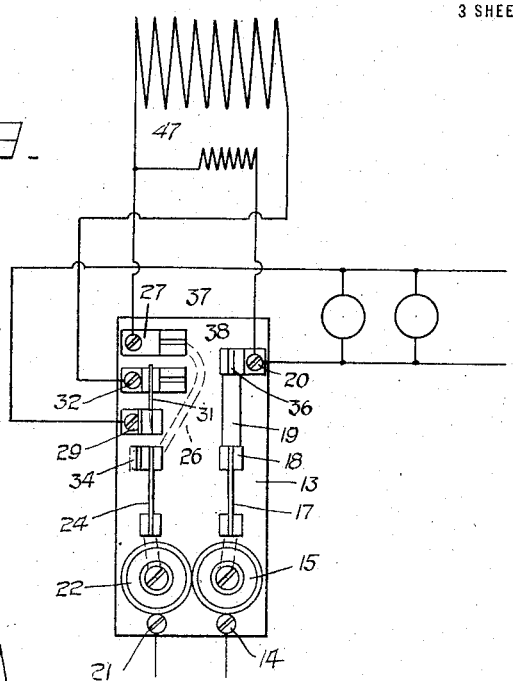
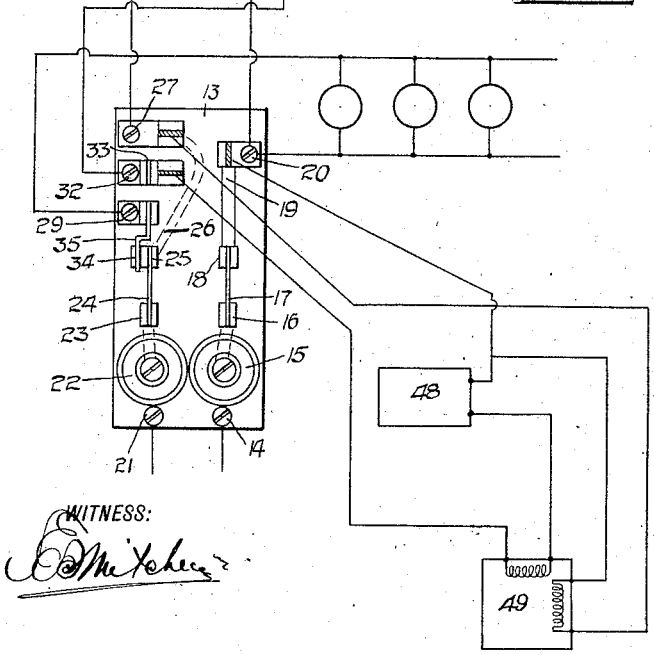

UNITED STATES PATENT OFFICE.

BENJAMIN E. GETCHELL, OF PLAINVILLE, CONNECTICUT, ASSIGNOR TO THE TRUMBULL ELECTRIC MFG. CO., OF PLAINVILLE, CONNECTICUT, A CORPORATION OF CONNECTICUT.

METER-TESTING SWITCH.

1,364,364. Specification of Letters Patent. Patented Jan. 4, 1921.

Application filed November 17, 1919. Serial No. 338,517.

*To all whom it may concern:*

Be it known that I, BENJAMIN E. GETCHELL, a citizen of the United States of America, residing at Plainville, Connecticut, have invented new and useful Meter-Testing Switches, of which the following is a specification.

My invention relates particularly to a construction adapted to inclosed types of switches.

The main object is to provide a simple and reliable form of construction with which the meter ordinarily installed in the system can be tested without interrupting the local circuit.

The apparatus involved has a main switch of the usual knife blade type and may have provision for protective fuses, as usual. In conjunction with this switch is a special auxiliary switch and sockets for a special three wire plug. This auxiliary switch and these sockets are provided with terminals for the meter and the load circuit so that by simply operating the auxiliary switch the meter is cut out of the load circuit and connected with the testing instruments by means of the plug.

Figure 1, is a front view of a switch embodying the improvements of my invention showing the parts in the normal operating position but with the cover of the box open.

Fig. 2, is a detail perspective view of the special plug for the testing instruments.

Fig. 3, is a perspective view of the movable member of the auxiliary switch.

Fig. 3ª is a detail edge view of a hinged jaw and terminal for said switch member and the local circuit.

Fig. 4 is a detail view of a combined main switch contact and auxiliary switch contact.

Fig. 5 is a detail edge view of a combined auxiliary switch contact, plug socket and meter terminal.

Fig. 6 is a side view showing the auxiliary switch with the meter cut out and the cover prevented from closing.

Fig. 7 is a fragmentary view with the auxiliary switch in the testing position and the testing plug inserted, the parts of the switch and plug terminals being shown in section on the plane of the line 7—7 of Fig. 8.

Fig. 8 is a sectional and side view showing the parts in the condition of Fig. 7 with the testing plug in place.

Fig. 9 is a diagrammatic view of the parts with the meter connected in a normal load condition.

Fig. 10 is a similar view showing the meter in series with the testing instruments.

The box consists of the body part 11 and the hinged cover 12 of any suitable type.

The switch mechanism proper is mounted on an insulating base 13. At one side is arranged the main line terminal 14 connected to the fuse plug socket 15, the hinge post 16, the switch blade 17, the switch contact 18, the strap 19 and the local circuit terminal 20.

On the other side is arranged the main line terminal 21, the fuse plug socket 22, the hinge post 23, the switch blade 24, the switch contact 25, the connector 26 and the meter terminal 27. As usual, in knife switches the two blades 17 and 24 are connected by a suitable insulating member 28.

The load circuit terminal 29 is provided with a hinge jaw 30 for supporting the auxiliary switch member 31. The other meter terminal 32 is connected with a switch contact 33 adapted to receive the main blade of the switch member 31. The main switch contact 25 comprises the U-shaped member having inturned spring jaws, and fastened to this switch as by means of a screw is an upright auxiliary switch contact 34 having the downturned spring jaw as shown, adapted to be engaged by the offset end 35 of the auxiliary switch member. The contacts 33 and 34 and the auxiliary switch member are so constructed and arranged with relation to each other that when moving the auxiliary switch member 31 from its position of Fig. 1 to that of Figs. 6, 7 and 8, the extension tip 35 engages the contact 34 before the main blade 31 leaves the contact 33 so that the load circuit is never interrupted when operating the auxiliary switch. The testing plug sockets 36, 37 and 38 are connected respectively with the load circuit terminal 20, the meter terminal 27 and the load circuit terminal 32.

The testing plug itself consists of three blades 39, 40 and 41 secured to an insulating block 42 for instance, by means of screws such as 43. Each blade is provided with a binding screw 44. The center of the block 42 is provided with a passage 45 for the testing wires and a notch 46 may be provided through the bottom of the block 42 for bringing out the ends of the three separate testing circuit wires.

In Fig. 9, the meter 47 is shown connected in its normal relation to the switch terminals 20, 27 and 32 and the auxiliary switch connecting the terminals 29 and 32. In this position it will be seen that one side of the main line is connected from the terminal 14 to fuse socket 15, switch blade 17, strap 19 and local circuit or load terminal 20. The other side of the main line is connected to the terminal 21, fuse socket 22, switch blade 24 and connector 26 to the meter terminal 27, thence through the meter to the terminal 32, auxiliary switch blade 31 and terminal 29 to the other side of the local or load circuit.

When it is desired to test the meter the auxiliary switch handle is raised so as to disconnect the terminal 32 from the terminal 29 and connect the latter with the contact 34 and thence through the connector 26 to the terminal 27, thus cutting the meter out of the load or local circuit. The meter testing plug is then inserted with its blades 39, 40 and 41 in the sockets 36, 37 and 38 respectively. This throws the meter into circuit with the testing instruments 48 and 49, so that the necessary tests and comparisons may be made. When through with the testing operation the plug will be removed and the auxiliary switch should be thrown into its original position. It will be noted that the cover of the box cannot be closed when the auxiliary switch is cut out in the meter testing position.

I claim:—

1. In a switch, a base, main terminals at one edge, a load terminal at another edge connected to one main terminal, a plug socket adjacent to and connected with said load terminal, three terminals at another edge, a pair of plug sockets connected to two of said three terminals, a switch blade pivotally connected to the other of said three terminals, a switch contact for said blade connected to another of said main terminals and a second switch contact for said blade connected to one of said pair of plug sockets.

2. In a switch, a base, main terminals at one edge, a load terminal at another edge connected to one main terminal, a plug socket adjacent to and connected with said load terminal, three terminals at another edge, a pair of plug sockets connected to two of said three terminals, a switch blade pivotally connected to the other of said three terminals, a switch contact for said blade connected to another of said main terminals and a second switch contact for said blade connected to one of said pair of sockets, said switch contacts and switch blade being so constructed and mounted that said blade will connect both contacts when swinging from one to the other.

3. In an electric switch, two main line connections, a combined meter and load line terminal and testing contact connected to one of said main line connections, a switch contact and a combined meter terminal and testing contact connected to the other main line connection, a combined meter terminal, switch contact and testing contact, a load line terminal, a switch member connected thereto and adapted to engage either of said switch contacts, whereby the meter may be normally in circuit with the load line but is adapted to have one of its coils disconnected when testing.

4. The combination of a main switch having contacts and swinging blades, an auxiliary stationary contact mounted adjacent one of said main switch contacts, and an auxiliary meter cut-out switch having a stationary contact and a hinged blade mounted between said stationary contact and said auxiliary stationary contact.

5. In a meter testing switch, a base, load line and meter terminals on said base, a stationary switch contact on said base and adapted to be connected to the main line, an auxiliary switch blade hinged to said base between said stationary switch contact and one of said meter terminals, said auxiliary switch blade being adapted to electrically connect said stationary switch contact and said last mentioned meter terminal with one of said load lines.

6. In a meter testing switch, main line terminals, load circuit terminals adapted to be electrically connected to said main line terminals, meter terminals normally in circuit with said load circuit terminals, two of said meter terminals having parallel spaced apart testing plug connections, another of said meter terminals having a testing plug connection spaced from said other connections and at right angles thereto, and an auxiliary switch for cutting out the meter without interrupting the flow of current to the load circuit.

7. The combination of a base, main line, load line and meter terminals mounted thereon, a box body containing said parts, a cover hinged thereto, plug testing sockets and switch terminals connected with some of said load and meter terminals and a switch blade for connecting, and disconnecting one of said meter terminals and the load circuit, said blade having a part standing in position to prevent closure of the cover when the meter is disconnected from the normal load circuit.

8. The combination of an insulating base, a main two-bladed switch and stationary switch contacts, a circuit terminal and plug socket electrically connected with one of said switch contacts, a meter terminal, plug socket and auxiliary switch contact electrically connected with the other switch contact, another plug socket, auxiliary switch contact and circuit terminal connected together and a combined hinged switch blade and circuit terminal located in such a position that the blade is adapted to engage either or both of said auxiliary switch contacts.

BENJAMIN E. GETCHELL.